Feb. 5, 1946.  M. H. LOUGHRIDGE  2,394,085
REVERSIBLE RATCHET
Filed Aug. 16, 1941  2 Sheets-Sheet 1
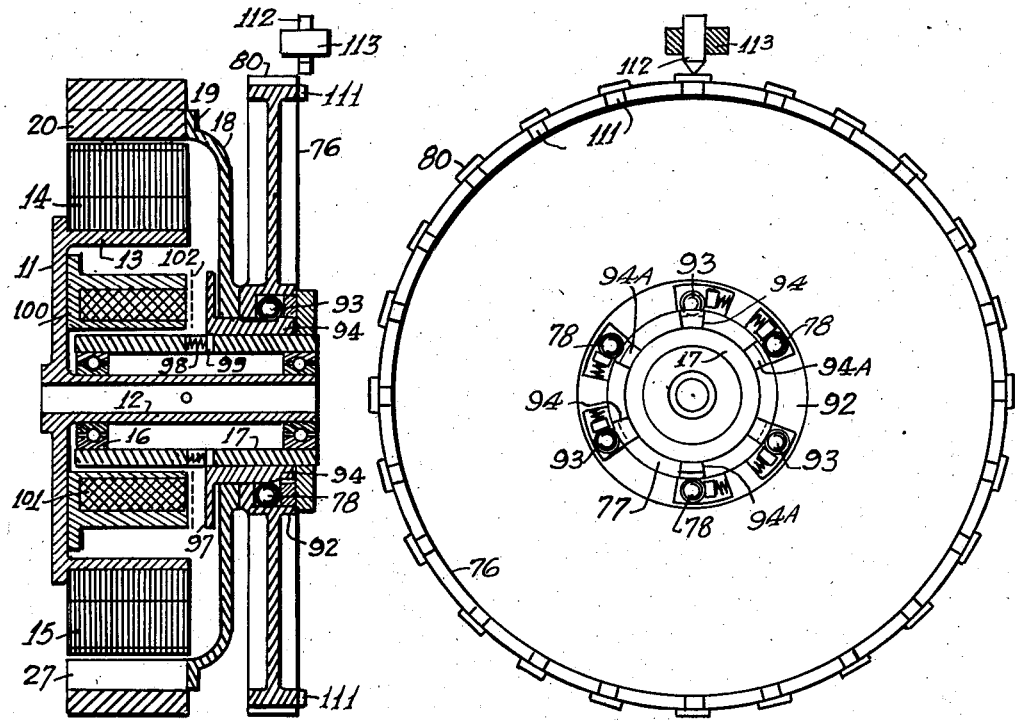
Fig.1
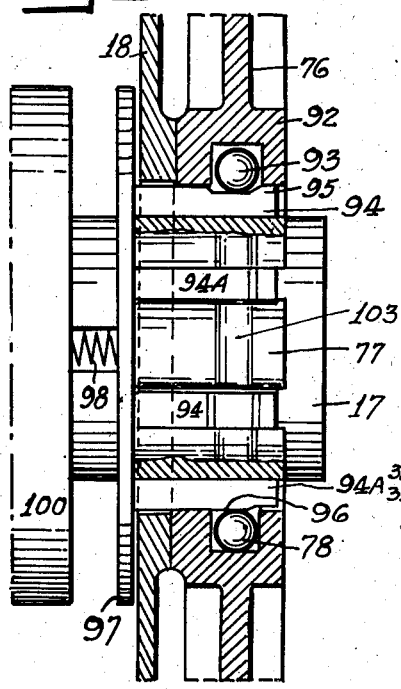
Fig.2
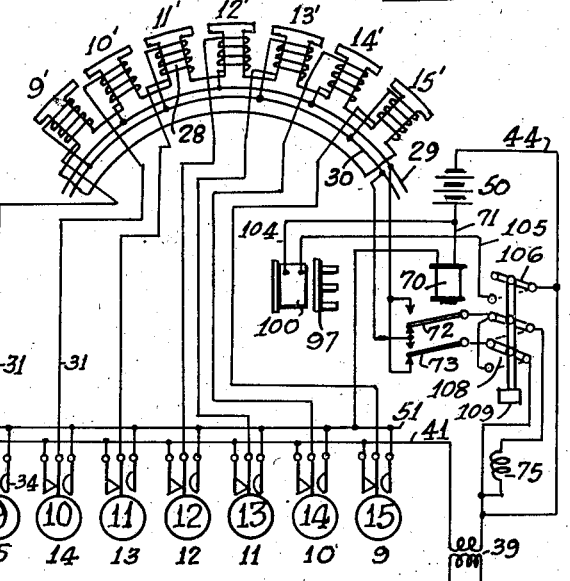
Fig.4
Fig.3
INVENTOR.
Matthew H. Loughridge Feb. 5, 1946.  M. H. LOUGHRIDGE  2,394,085
REVERSIBLE RATCHET
Filed Aug. 16, 1941  2 Sheets-Sheet 2

INVENTOR.
Matthew H. Loughridge

Patented Feb. 5, 1946

2,394,085

UNITED STATES PATENT OFFICE 2,394,085

REVERSIBLE RATCHET

Matthew H. Loughridge, Bogota, N. J.; William R. Lockridge administrator of said Matthew H. Loughridge, deceased Application August 16, 1941, Serial No. 407,245

9 Claims. (Cl. 192—44)

This invention relates to ratchets and is shown applied to a ratchet of the over-running ball type and is of general application. An object of the invention is to provide a reversible ratchet; another object is to provide a ratchet that is engaged and disengaged by a member moving transverse to the direction of the engagement of the ratchet; another object of the invention is to provide a hub and a rotating member mounted thereon and connected with the hub by a ball ratchet with means for making the ratchet operative or inoperative, and another object of the invention is to provide a hub with a rotating member thereon connected with the hub by a ball ratchet, the hub having slots therein and fingers located in the slots, flush with the hub for changing the inclined plane of the ratchet.

Another object of the invention is to provide a driver shaft or hub with a rotating member mounted thereon and a first ball ratchet for engaging the member with the hub in one direction and a second ball ratchet for engaging the member with the hub in the opposite direction, and another object of the invention is to provide a driver hub with a rotating member mounted thereon and connected with the hub by a first ratchet in one direction and by a second ratchet engaging in the opposite direction with means for cooperatively controlling the direction of drive and the engaging ratchet.

Other objects of the invention are embodied in the mechanism which make it compact, provides for remote control and operates the ratchet control with relatively little friction. These and other objects of the invention will be understood from the following specification and from the drawing selected to show a particular form of the invention and in which:

Fig. 1 is a front view of the ratchet applied to an accumulator of an adding machine and showing the reversed ball ratchets the cover therefor being removed to facilitate illustration;

Fig. 2 is a vertical cross section of Fig. 1 showing an electric driving mechanism and a magnet for controlling the ratchet;

Fig. 3 is an enlarged view of the hub in Fig. 2 with the rotor sectioned thereon;

Fig. 4 is a circuit diagram and keyboard that may be used for controlling the apparatus in Figs. 1 to 3;

Figure 5:
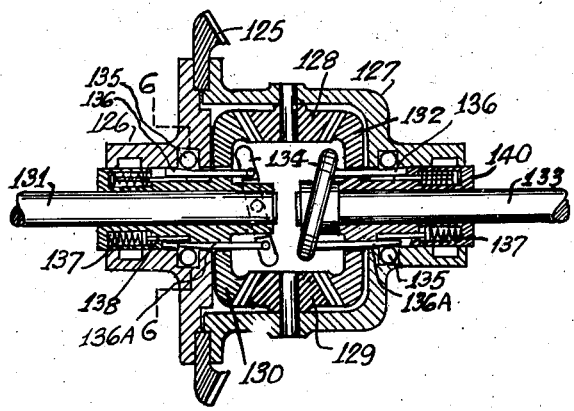
Fig. 5 is a sectional elevation of a differential mechanism in which the ratchet mechanism is used for locking the differential subject to a speed centrifuge.

Ball ratchets are used in a variety of mechanisms in which a ball is located in the cavity between the driver and the driven member and rolls up an inclined plane in the engaging direction to lock the driver and driven member together. In the opposite direction the ball rolls down the inclined plane and releases the ratchet. However, it is desirable in certain mechanisms to be able to render the ratchet inoperative so that under these conditions the driver and the driven member move freely of each other. For this purpose, in the mechanism of this case, the inclined plane of the ratchet is shifted by a mechanism outside the ratchet. This comprises a finger movable in a slot in the hub and containing the inclined plane so that the finger may be moved in the slot to a position to engage the ratchet or to disengage it.

When a pair of ratchets are provided in reversed order the fingers are provided with inclined planes in the reversed order and are connected to move as a unit so that when one set of fingers are moved into the engaging position the other set is moved into the disengaging position, alternately making either ratchet effective as desired. These fingers move in slots in the driver element parallel with its axis and transverse to the direction in which the ratchet engages. The ball provides an anti-friction roller engaging these fingers so that the ratchet may be changed, even under load, with relatively little friction.

A magnet may be mounted about the axis of the hub and operates an armature against a spring which armature moves the fingers so that energizing the magnet brings one set of fingers into operation to engage one of the ratchets and disengage the other and the spring, when the magnet is deenergized reverses this operation.

In certain mechanisms, such as adding machines, cash registers and the like, accumulator discs are operated progressively to establish accumulated totals from a series of operations that start at zero. In this case the ratchet is engaged by the forward drive of the mechanism but is released by the ratchet upon the return or backward drive to the starting position. The next operation of the driving mechanism through the ratchet carries forward the disc from the previous position according to the extent of the second operation and in this manner succeeding amounts are totalized. When it is necessary to deduct amounts from the accumulated total, or for any other purpose in which the disc is to move backwards, the ratchet mechanism is reversed and at the same time the drive is reversed so that the results are set up in a negative direction. The electric control provides for operating the driver in both directions and for correspondingly engaging the ratchet according to the direction of the drive.

Figs. 1 to 4 are divided out of application Serial No. 282,833, filed July 4, 1939, now Patent No. 2,323,822, issued July 6, 1943. The electric drive comprises a "motorstat" operated on the plan of a split phase motor as disclosed in said patent and controlled by a keyboard so that the drive is advanced from zero to a position corresponding with the key that is operated and, after the operation, its direction of drive is reversed until it reaches the zero position. A magnetic clutch or control device is cooperatively operated by the keys so as to engage the forward ratchet when the drive is in the forward direction and, subject to manual control, to engage the reverse ratchet when the drive is in the reverse direction.

When applied to a differential mechanism for locking the mechanism when an excessive speed develops on one of the driven shafts, a centrifuge, rotating with the shaft, and acting against a spring moves the fingers in the hub so as to bring a ball ratchet, which otherwise remained idle, into engagement, thereby locking one side of the differential mechanism and thus locking the entire mechanism.

In certain applications it may be necessary to cancel a record that has been established or to deduct amounts from totals previously established. For this purpose it is necessary to drive the recording disc forward for accumulating totals and it is necessary to reverse the operation of the mechanism so that the disc may be driven backwards to an extent determined by the operating keys for making deductions. For this purpose the disc is connected with the rotor by one set of ball clutches which engage during the forward movement of the rotor only, and a second set of ball clutches which engage during the backward movement of the rotor only. The engagement of the ball clutches is determined by a magnet controlled by the operating circuits. The mechanism in Figs. 1 to 4 as applied to a machine of the adding machine type will now be described.

In Fig. 1 the hub 92 of the recording disc 76 is provided with one set of ball clutches 78 engaging in the normal direction and with a second set of ball clutches 93 engaging in the reverse direction. The hub 77 which rotates integral with hub 17, is provided with longitudinal slots, one below each ball of the clutch, in which the fingers 94, 94A slide back and forth respectively; these fingers being connected to the disc armature 97 of the electromagnet 100 and they are normally moved towards the right by the springs 98 located in slots in the hub 17 and engaging the depending fingers 99 from armature 97.

The shape of the fingers 94 will be understood from Fig. 3 in which the top finger under ball 93 has spaced from its outer end 95 a depression under the ball, and all the fingers engaging the set of balls indicated by 93 are similarly constructed. The finger 94A, at the bottom of Fig. 3, has an enlarged section 96 engaging ball 78 and a reduced section at the right hand end, and all the fingers engaging balls 78 are similarly constructed. The ends of the depressions in fingers 94 are inclined, and the enlarged and reduced portions of fingers 94A are joined by an incline. The ball clutch engages by each ball rolling up its associated incline. When the armature 97 is released from magnet 100 the spring 98 moves the fingers 94A to provide inclines to move the balls 78 to engaging position, while the balls 93 are located in the depressions respectively of their cooperating fingers 94 and cannot engage the ratchet. When armature 97 is attracted by magnet 100 each ball 78 is then located over the reduced part in its cooperating finger 94A and is unable to clutch, while each ball 93 aided by the inclined end of the depression is located over the portion 95 of its finger 94 and is therefore in the clutching position. This insures that the disc 76 is driven in the forward direction when the magnet 100 is deenergized and it is released on the reverse movement of the rotor; also, when magnet 100 is energized the disc 76 is driven in the reverse direction by the rotor and is released when the rotor is reversed and restored to the starting position.

The hub 77 is preferably provided with a depression 103, forming a portion of the ball race, so that the balls clutch only when in engagement with the fingers 94 or 94A. Magnet 100, provided with the winding 101, is mounted on the fixed flange 11 and has an open core in the center to provide for the free movement of the hub 17. The springs 98 limit the movement of armature 97 to the position indicated by the dotted line 102 so that when the magnet is energized there is an air gap between it and the armature 97 and as armature 97 rotates with the hub 17, there is no sliding friction when the clutch is engaged for either direction of running.

A locking arrangement may be provided for the registering disc 76 by the notches 111 which are engaged by the plunger 112 sliding in the frame 113 and brought into operation before the register is made.

The circuit for controlling the double clutch is shown in Fig. 4 in which the switch 109 is provided to change over the control from the normal direction of rotation of the rotor to the reverse direction. This comprises a pole changer 108 connected to the fingers 72 and 73 of relay 70 and from this relay to the annular conductors 29 and 30. Switch 108 connects to wire 44 and is arranged to change over the inductance 75 from conductor 29 to conductor 30. The operation of switch 109 reverses the rotation of the rotor from the direction of rotation that is established by relay 70. The clutch magnet 100 is connected with battery 50 by conductor 104 and is controlled by switch 106 connecting to conductor 105. When switch 109 is in the normal position shown the circuit of magnet 100 is open and the spring 98 brings the ball ratchet 78 into operation. When switch 109 is reversed a circuit is established from conductor 44, through switch 106 to conductor 105 which energizes clutch magnet 100 and brings the opposing ball ratchet 93 into operation.

A row of keys, numbered from 9 to 15 inclusive, are shown, connected respectively by conductors 31 to the coils of the stator on the poles indicated from 9' to 15' inclusive. It will be noted that a plus sign appears in front of the row of numbers on the keys, indicating that the rotor is moved from zero in a normal direction, corresponding with the number on the key that is pressed. Since amounts deducted from the established total are obtained by reversing the direction of movement of the rotor from the zero position, the figures representing the amount to be subtracted are set up in the reverse order from the figures that are used when the rotor is rotating in the normal direction. A row of figures with a negative sign in front thereof, from 15 to 9 inclusive, is placed adjacent to the keys so that negative totals are set up according to the reading of these figures, which are complementary to the positive row of figures for a rotor that has twenty-four positions.

Figure 6:
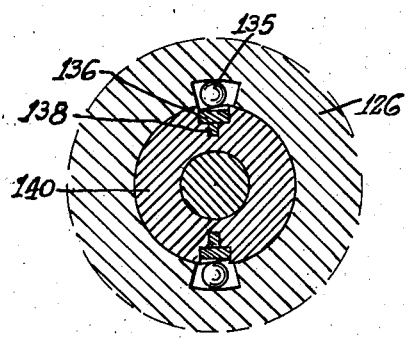
Fig. 6 is a section on line 6—6 of Fig. 5.
Figure 7:
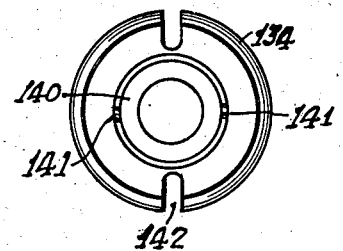
Fig. 7 is a front view of the centrifuge disc used in Fig. 5.
Figures 8, 9:
Figs. 8 and 9 are end views of the two types of ball engaging fingers and illustrate respectively the upper and lower fingers as seen in Figs. 1 and 3.

In the differential mechanism Figs. 5 to 7, the driving gear 125 is mounted on the housing 126, 127 and carries the differential gear 128 and 129 engaging gear 130 on shaft 131 and the opposing gear 132 on shaft 133. This construction corresponds with the usual construction found in a differential mechanism. The gear 132 is provided with a hub 140 which is splined to the shaft 133 and the inner end of the hub has a centrifuge disc 134 mounted thereon by the pivots 141, Fig. 7, which permits this disc to swing on the hub. Slots are provided at 142 in disc 134 for the pivotal connection of sliding fingers 136 and 136A which move in slots in the hub as indicated in Fig. 6 and engage the balls 135 in the cavities of the hub or housing 127 which forms the ball ratchet. The top finger 136 is moved in one direction and the bottom finger 136A is moved in the opposite direction as shown in Fig. 5. When the shaft 133 runs at excessive speed the disc 134 assumes a position at right angles to the shaft and moves the fingers 136 in a direction to engage the inclined plane at the end of each of these fingers with the ball in each cavity, thereby locking gear 132 and housing 127 together, which locks the differential. The fingers 136 and 136A are provided with plungers 138 respectively extending into an associated spring cavity and engaging spring 137 therein in a manner to tend to move the discs 134 into the position shown and disengage the ratchets.

In normal operation the springs 137 have sufficient resistance to oppose the centrifugal action of the disc 134 so that normally the differential mechanism operates in the usual way. When traction is lost by either shaft 131 or 133 the drive is then all transmitted to the free shaft which rotates at an excessive speed and brings the centrifuge into operation to temporarily lock the differential until the excessive speed is reduced.

From Fig. 5 it will be understood that a centrifuge is used in connection with gear 130 and a similar centrifuge is used in connection with gear 132, this provides a centrifuge for whichever of the two shafts are running at excessive speed. Locking of either gear 130 or 132 to the housing locks the entire mechanism.

The ratchet mechanism and its control is of general use in the mechanical arts and may be applied to any kind of a drive.

Having thus described my invention, I claim:

1. In a ratchet mechanism, a driver member, a driven member associated with the driver, a plurality of cavities between said members, each having a ball ratchet engaging an inclined plane in the cavity, and sliding fingers operating transversely of the direction of ratchet engagement and carrying said inclined planes to render the ratchet mechanism operative or inoperative.

2. In a ratchet mechanism, a drive shaft with a hub, a driven member mounted on said hub, communicating cavities in said hub and member with a ball ratchet in one of said cavities, a sliding finger in the other of said cavities with an inclined plane to engage or disengage said ball to render the ratchet mechanism operative or inoperative, and means mounted on said shaft for moving said finger.

3. In a ratchet mechanism, a drive shaft with a hub, a driven member mounted on said hub, a plurality of cavities between said hub and member, a ball ratchet in each cavity, a sliding finger for each cavity sliding parallel to the axis of said shaft with an inclined plane to engage or disengage said ball to render the ratchet mechanism operative or inoperative, a collar for moving said fingers and means centered on the axis of said shaft for moving said collar.

4. In a ratchet mechanism, a drive shaft with a hub, a driven member mounted on said hub, a plurality of cavities between said hub and member, a first ball ratchet in some of said cavities engaging for movement in a normal direction, a second ball ratchet in other of said cavities engaging for movement in the reverse direction, a sliding finger for each cavity with an inclined plane to engage or disengage the ball to render the ratchet mechanisms operative or inoperative, means connecting said fingers to slide together to move the fingers of the first ratchet to engaging position, and the fingers of the second ratchet to disengaging position.

5. In a ratchet mechanism, a driver member, a driven member associated with the driver, a plurality of cavities between said members, each having a ball ratchet engaging an inclined plane in the cavity, a sliding finger for each cavity movable in the cavity to change the position of the inclined plane, and means responsive to the speed of the driver member for moving said sliding fingers.

6. In a ratchet mechanism, a hub, a rotating member mounted on said hub, a cavity between said hub and member, a ball in said cavity, said hub having an annular depression forming part of the race for said ball and connecting with the cavity, a finger sliding in a groove in said hub parallel with the axis of said hub and flush with said hub, and an inclined plane on said finger engaging said ball for bringing the ratchet into operation.

7. A ratchet mechanism comprising a driving member, a driven member, a ball ratchet between said members engaging an inclined plane in one of the members to establish a driving connection between said members, means for moving said inclined plane and centrifuge means operated by one of said members for operating said moving means.

8. A ratchet mechanism comprising a driving member, a driven member, a ball ratchet between said members engaging an inclined plane in one of the members to establish a driving connection between said members, sliding fingers carrying said inclined plane for engaging and disengaging said drive and centrifuge means driven by one of said members for operating said sliding fingers.

9. In a ratchet mechanism, a hub, a rotating member mounted on said hub, a ball ratchet located between said hub and said member, a plurality of grooves in said hub parallel with its axis, a sliding finger having an inclined plane in each groove and substantially flush with the surface of the hub and means for moving said sliding fingers to engage and disengage said ratchet.

MATTHEW H. LOUGHRIDGE.